United States Patent
Guo et al.

(10) Patent No.: US 12,245,308 B2
(45) Date of Patent: Mar. 4, 2025

(54) USE OF A FULLY PROTECTED CONNECTION RESUME MESSAGE BY A BASE STATION (BS) AND USER EQUIPMENT DEVICE (UE)

(71) Applicant: Apple Inc., Cupertino, CA (US)

(72) Inventors: Shu Guo, Beijing (CN); Xiangying Yang, Cupertino, CA (US); Fangli Xu, Beijing (CN); Yuqin Chen, Beijing (CN); Huarui Liang, Beijing (CN); Haijing Hu, Los Gatos, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 364 days.

(21) Appl. No.: 17/776,449

(22) PCT Filed: Jan. 31, 2020

(86) PCT No.: PCT/CN2020/074104
§ 371 (c)(1),
(2) Date: May 12, 2022

(87) PCT Pub. No.: WO2021/151244
PCT Pub. Date: Aug. 5, 2021

(65) Prior Publication Data
US 2022/0418030 A1    Dec. 29, 2022

(51) Int. Cl.
*H04W 76/00* (2018.01)
*H04W 12/106* (2021.01)
(Continued)

(52) U.S. Cl.
CPC ......... *H04W 76/19* (2018.02); *H04W 12/106* (2021.01); *H04W 36/0007* (2018.08);
(Continued)

(58) Field of Classification Search
CPC ... H04W 72/231; H04W 76/00; H04W 76/06; H04W 76/19; H04W 76/30; H04W 72/30; H04W 36/0007
See application file for complete search history.

(56) References Cited

U.S. PATENT DOCUMENTS

| | | | |
|---|---|---|---|
| 2019/0059128 A1* | 2/2019 | Gage | H04W 12/043 |
| 2019/0320316 A1* | 10/2019 | Mildh | H04W 76/18 |
| 2020/0260283 A1* | 8/2020 | Hu | H04W 76/19 |

FOREIGN PATENT DOCUMENTS

| | | |
|---|---|---|
| CN | 109729524 | 5/2019 |
| CN | 109729524 A | 5/2019 |

(Continued)

OTHER PUBLICATIONS

R2-162493, "RRC structure for NB-IOT", Apr. 11-15, 2016, pp. 1-39 (Year: 2016).*

(Continued)

*Primary Examiner* — Salvador E Rivas
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) and/or cellular network to resume a connection. To resume the connection, the UE may transmit a fully protected connection resume message, e.g., which may include protection for a resume cause field.

20 Claims, 13 Drawing Sheets

(51) Int. Cl.
  *H04W 36/00* (2009.01)
  *H04W 72/231* (2023.01)
  *H04W 72/30* (2023.01)
  *H04W 76/19* (2018.01)
  *H04W 76/30* (2018.01)

(52) U.S. Cl.
  CPC ......... *H04W 72/231* (2023.01); *H04W 72/30* (2023.01); *H04W 76/00* (2013.01); *H04W 76/30* (2018.02)

(56) References Cited

FOREIGN PATENT DOCUMENTS

| | | |
|---|---|---|
| CN | 110312296 A | 10/2019 |
| KR | 1020140050724 | 4/2014 |
| KR | 1020180018415 | 2/2018 |
| KR | 1020200003223 | 1/2020 |
| WO | 2013024001 A1 | 2/2013 |
| WO | 2019161538 A1 | 8/2019 |
| WO | 2021/096411 | 5/2021 |

OTHER PUBLICATIONS

R2-160475, "RRC Connection Suspend and Resume", Jan. 19-21, 2016, pp. 1-14 (Year: 2016).*
R2-162866, "Security aspects of NB-IoT", Apr. 11-15, 2016, pp. 1-3 (Year: 2016).*
R2-1800431, "Security for RRCConnectionResumeRequest message", Jan. 22-26, 2018, pp. 1-7 (Year: 2018).*
R2-1802373, "Security for RRCResumeRequest message", Feb. 26-Mar. 2, 2018, pp. 1-8 (Year: 2018).*
Decision of Grant for JP Patent Application No. 2022-531572; Feb. 13, 2024.
Ericsson "Updates to solution #17—resolving ENs"; 3GPP TSG SA WG3 #97 S3-194668; Nov. 18, 2019.
Huawei et al. "Update on Protection of RRC Resume Request message"; 3GPP TSG SA WG3 #96 S3-192783; Aug. 26, 2019.
International Search Report and Written Opinion for PCT/CN2020/074104; 9 pages; Oct. 28, 2020.
Ericsson "Security aspects of NB-IoT"; 3GPP TSG-RAN WG2 #93 R2-161742; Malta; 4 pages; Feb. 15-19, 2016.
Extended European Search Report for EP Patent Application No. 20916837.6; 10 pages; Sep. 23, 2022.
"3rd Generation Partnership; Technical Specification Group Services and System Aspects Study on 5G Security Enhancements Against False Base Stations"; Release 16; 67 pages; Jan. 2, 2020.
"3rd Generation Partnership Project; Technical Specification Group Services and System Aspects; Study on architecture enhancements for Cellular Internet of Things"; 97 pages; Mar. 24, 2016.
Ericsson "RRC Connection Suspend and Resume"; 3GPP TSG-RAN WG2 NB-IoT Ad-hoc Meeting Tdoc R2-160475; Budapest, Hungary: 14 pages; Jan. 19, 2016.
Huawei et al. "Protecting RRCResumeRequest against MiTM"; 3GPP TSG SA WG3 (Security) Meeting #94 ad-hoc S3-190667; Kista, Sweden; 2 pages; Mar. 11, 2019.
Huawei "Summary of email discussion: [NBAH#04][NBIOT/Resume] RRC Functions for suspend-resume"; 3GPP TSG-RAN WG2 Meeting #93 R2-161166; St. Julian's, Malta; 26 pages; Feb. 15, 2016.
Office Action for JP Patent Application No. 2022-531572; Jun. 1, 2023.
Office Action for CN Application No. 202080082875.4; Oct. 31, 2024.
3rd Generation Partnership Project; Technical Specification Group Services and System Aspects Study on 5G Security Enhancement against False Base Stations (Release 16); 3GPP TR33.809 V0.8.0; Nov. 2019.
Notice of Allowance for KR 10-2022-7027673; Dec. 14, 2024.

* cited by examiner

USE OF A FULLY PROTECTED CONNECTION RESUME MESSAGE BY A BASE STATION (BS) AND USER EQUIPMENT DEVICE (UE)

PRIRORITY CLAIM

This application is a national phase entry of PCT application number PCT/CN2020/074104, entitled "Protection of Resume Request Messages," filed Jan. 31, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to apparatuses, systems, and methods for protecting messages related to resuming a connection.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, a UE may suspend or release a connection with a network. Messages related to resuming a connection may be vulnerable to man in the middle (MiTM) attacks. Accordingly, improvements in the field may be desired.

SUMMARY

Techniques, apparatuses, systems, and methods are disclosed for a user equipment device (UE) and cellular network to resume a suspended or released connection (e.g., a radio resource control (RRC) connection). A UE and/or network may determine support for exchanging messages (e.g., RRCResumeRequest) relating to resuming a connection using a new format. After determining support, the connection may be released/suspended. The UE may transmit a message to the network in order to resume/reestablish the connection.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
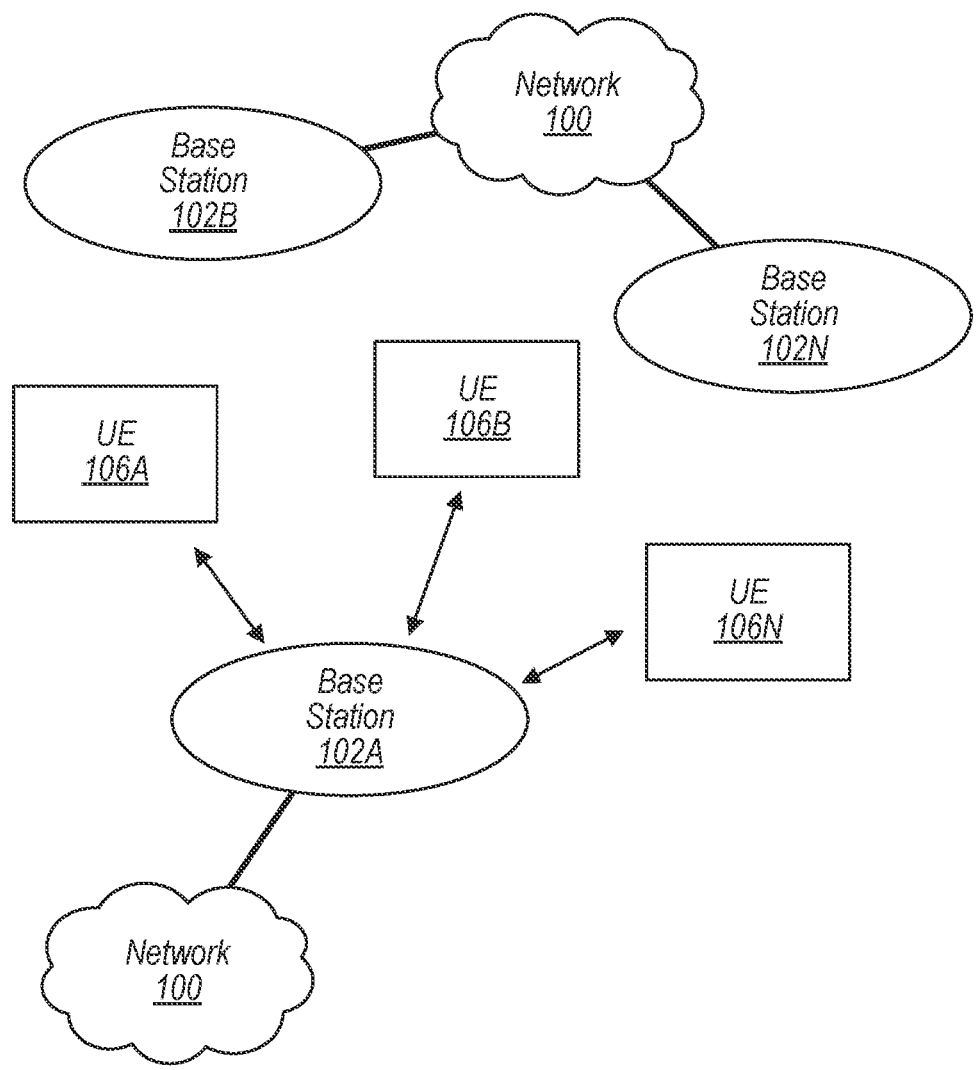
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms may be used in the present Patent Application:
UE: User Equipment
BS: Base Station
gNB: gNodeB (Base Station)
NR: new radio
LTE: Long Term Evolution
VoLTE: voice over LTE
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
UL: uplink
DL: downlink
RS: reference signal
PLMN: Public Land Mobile Network

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
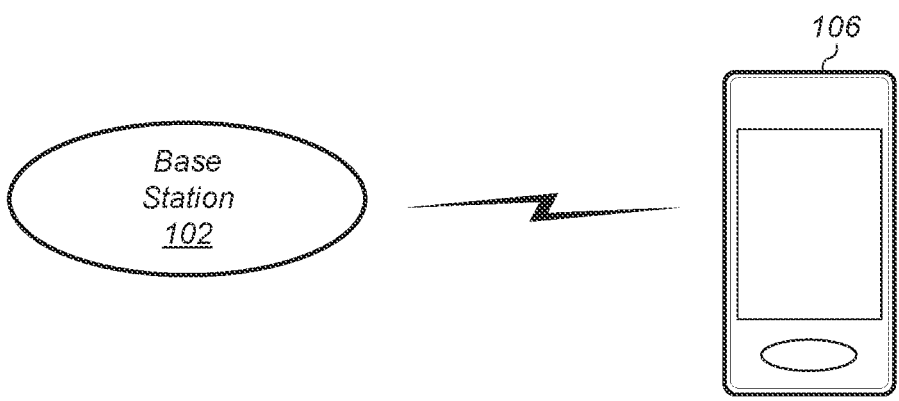
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

In some embodiments, UE 106 may communicate (e.g., concurrently) with multiple BS 102s. One or more BS 102s may make up a radio access network (RAN).

Figure 3:
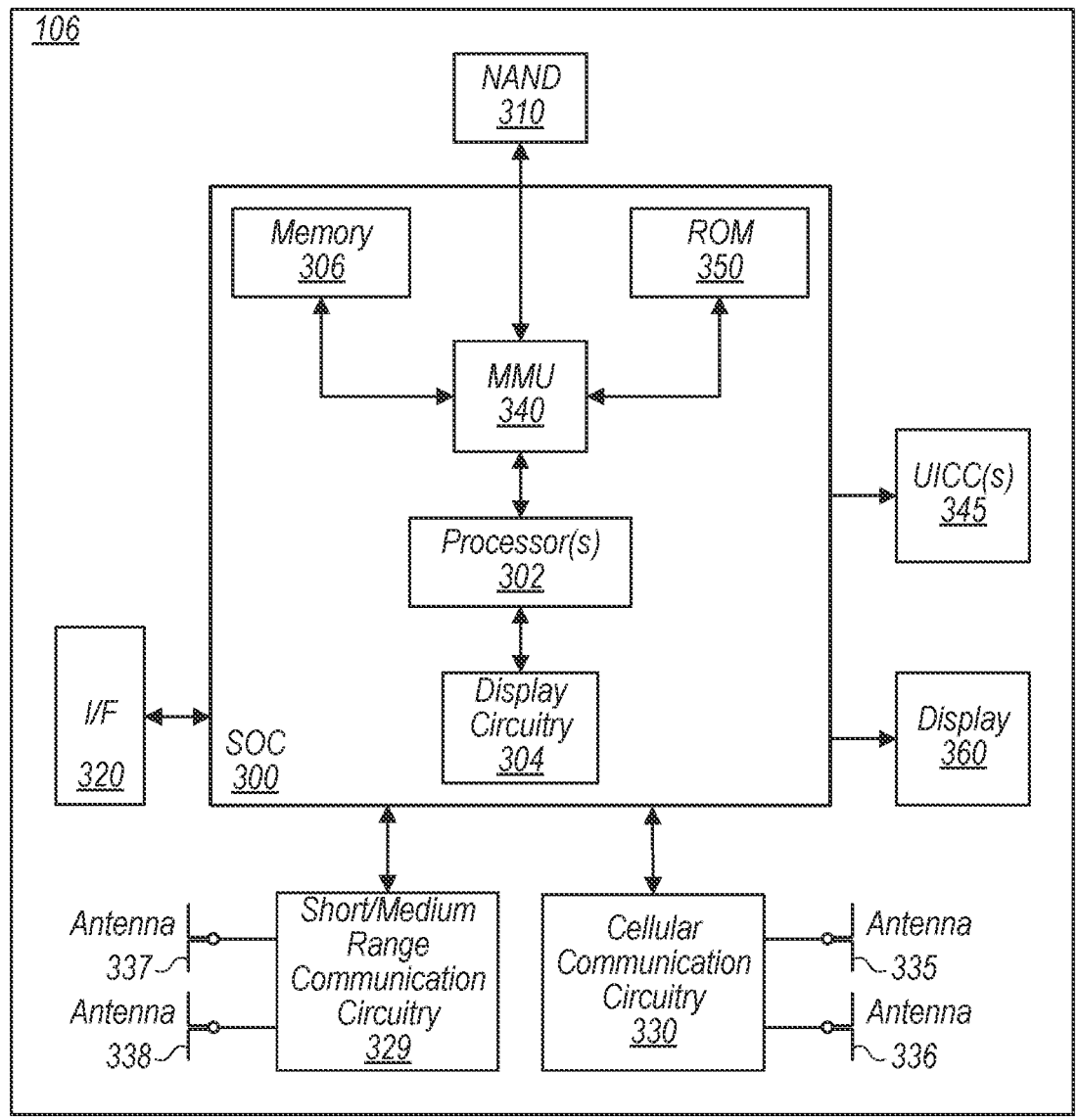
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
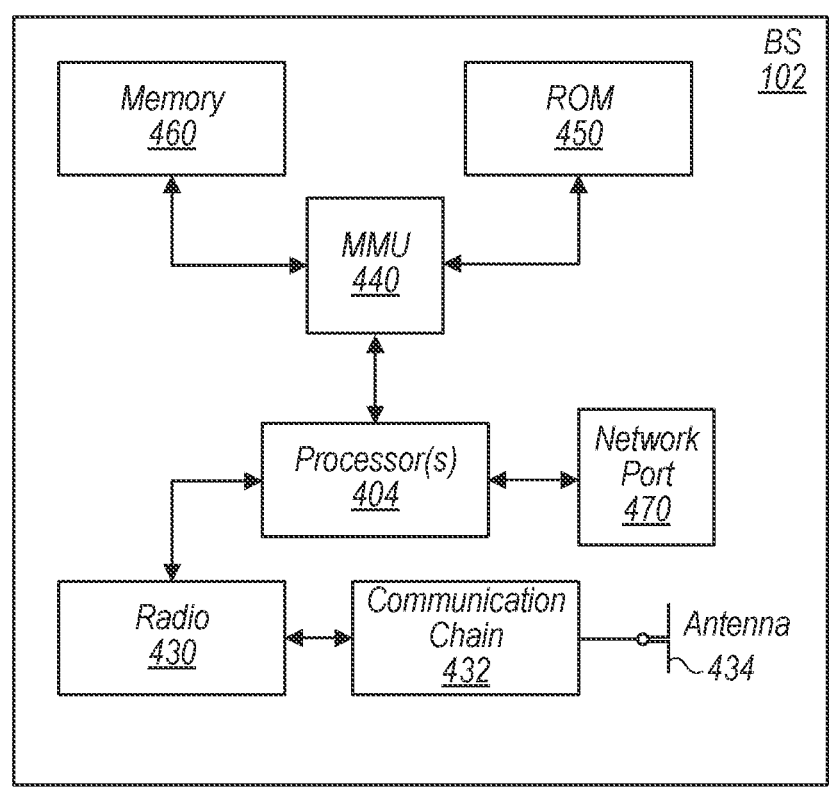
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

In some embodiments, a BS 102 may provide access to a cellular network via a 3GPP access and/or a non-3GPP access. In some embodiments, a BS 102 that provides a non-3GPP access may be referred to as an access point.

Figure 5:
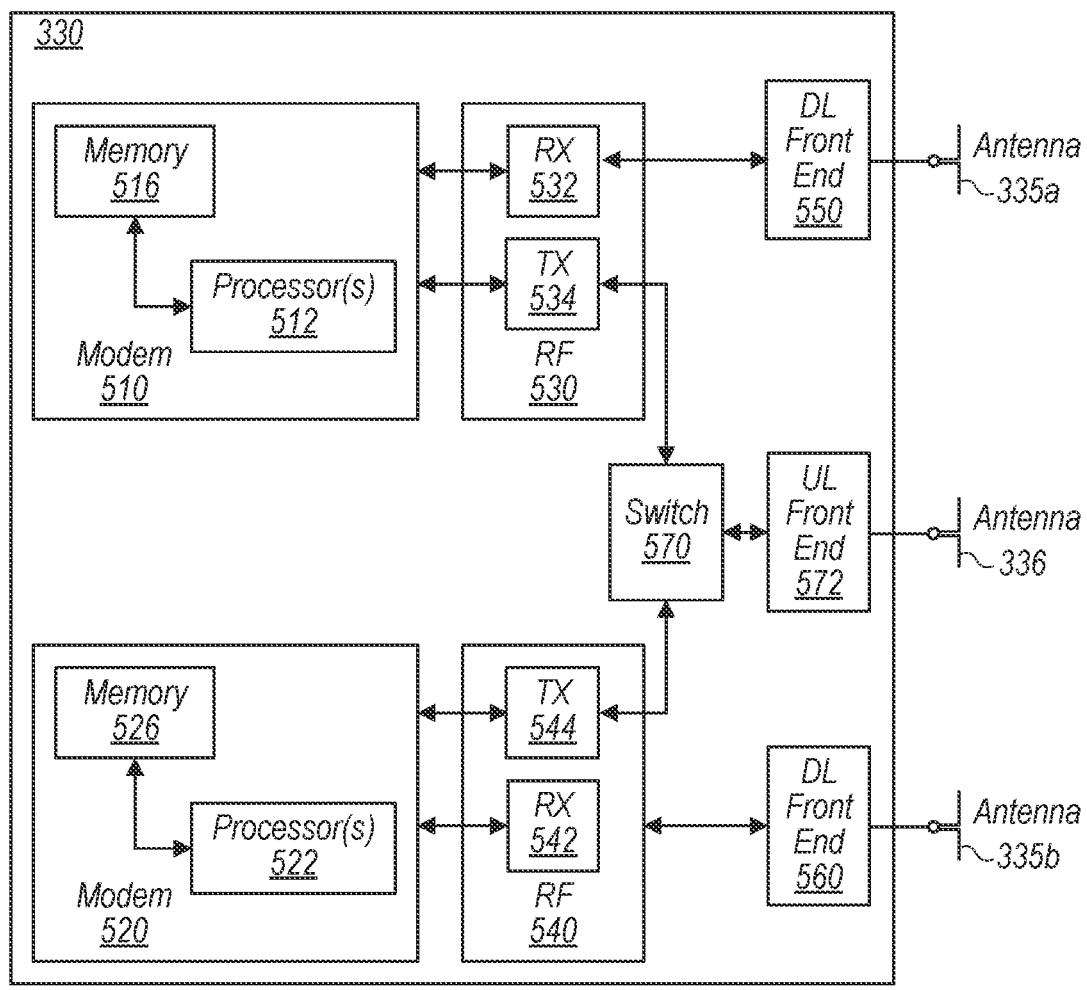
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch (e.g., and/or combiner, multiplexer, etc.) 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, modem 510 and modem 520 may be configured to transmit at the same time, receive at the same time, and/or transmit and receive at the same time.

Thus, when cellular communication circuitry 330 receives instructions to transmit according to both the first RAT (e.g., as supported via modem 510) and the second RAT (e.g., as supported via modem 520), combiner 570 may be switched to a third state that allows modems 510 and 520 to transmit signals according to the first and second RATs (e.g., via a transmit circuitry 534 and 544 and UL front end 572). In other words, the modems may coordinate communication activity, and each may perform transmit and/or receive functions at any time, as desired.

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
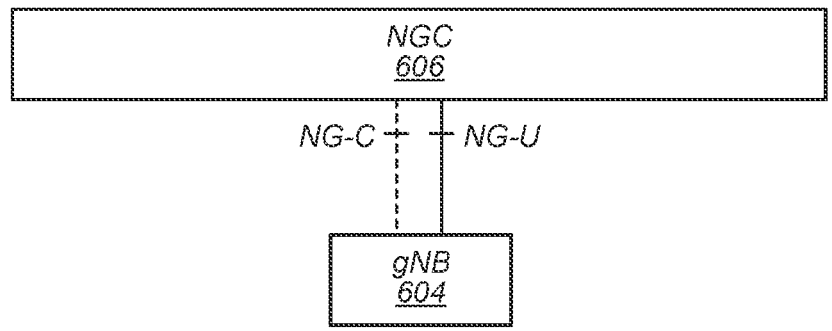
FIGS. 6 and 7 illustrate examples of a 5G NR base station (gNB), according to some embodiments.
Figure 7:
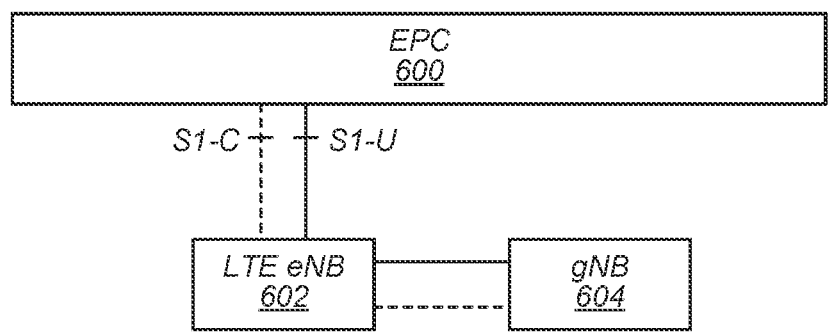

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
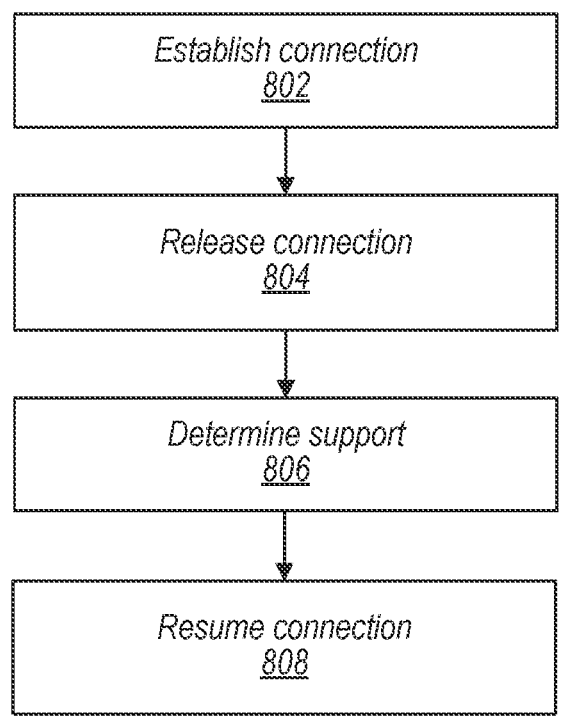
FIG. 8 illustrates an example method of protecting resume request messages, according to some embodiments.

FIG. 8—Protection of Resume Request Messages

In some embodiments, a UE may transmit one or more messages to a network in order to reestablish or resume a previously suspended/released connection, e.g., an RRC connection. For example, the UE may use an RRCResumeRequest message for this purpose. Note that, as used herein, the term "RRCResumeRequest" may include similar messages such as RRCResumeRequest1, among others.

Various messages may be protected using one or more techniques. For example, authentication tokens such as media access control (MAC) tokens may be used to allow a receiver to verify a message, e.g., which may be based on the symmetric cryptography. A ResumeMAC-I or short ResumeMAC-I may be used to protect an RRCResumeRequest message, according to some embodiments. The sender (e.g., such as a UE 106) and the receiver (e.g., such as a BS 102 such as a gNB) may share a same, shared key for this MAC-I. When the receiver gets this message with a ResumeMAC-I or short ResumeMAC-I, it may verify the MAC-I using the shared key. If the verification using the shared key is successful, the receiver may determine that the resume request message associated with the MAC-I is genuine. Otherwise, the message may be treated as a false one. Note that for purposes of conciseness, the term "ResumeMAC-I" as used herein may be understood to include a short ResumeMAC-I and/or a long/full ResumeMAC-I.

However, some fields, such as the resumecause field in the RRCResumeRequest message may not protected by the ResumeMAC-I, according to some embodiments. Thus, the integrity of the resumecause field in the RRCResumeRequest message may not be provided, e.g., this field may not be protected. Therefore, a man in the middle (MiTM) attack (e.g., by a false base station or false UE) may be possible, e.g., by modification of the resumecause from one value to another. This attack may harm the quality or type of service offered by the network to the UE. In addition, in 5G, "RAN update" may be added as another value of the resumecause field. If an attacker were to modify the resumecause field value from "emergency" to "ran update", the network may not be able to detect the attack. Further, the network may (e.g., immediately) send the UE back to INACTIVE (e.g., suspend/release the RRC connection) while the UE is waiting to establish an emergency call, for example.

In some proposals, e.g., according to 3GPP technical report (TR) 33.809, the whole RRCResumeRequest should be taken as the input of the ResumeMAC-I. In other words, all fields of the RRCResumeRequest, including the resumecause field, may be input into the ResumeMAC-I, and may thus be protected. Thus, according to such proposals, a "new" ResumeMAC-I may take the whole RRCResumeRequest message as the input (e.g., for protection according to the token). Such a "new" ResumeMAC-I and/or a RRCResumeRequest message may be referred to as a fully protected connection resume message. In other words, a fully protected connection resume message may include the resume cause field as an input to the MAC-I token. All fields of the connection resume message except the ResumeMAC-I part may be protected, according to some embodiments. In some embodiments, all of the fields of a fully protected connection resume message may be protected. In contrast, the "old" ResumeMAC-I may leave at least one field (e.g., the resume cause field, and/or one or more other fields) unprotected. The "old" ResumeMAC-I may only take the following inputs, e.g., consistent with 3GPP technical specification (TS) 38.331, v.15.8.0, clause 7.4: sourcePhysCellID, targetCellIdentity and source-c-RNTI. sourcePhysCellID may be set to the physical cell identity of the primary cell (PCell) the UE was connected to prior to suspension of the RRC connection. targetCellIdentity may be an input variable used to calculate the resumeMAC-I. It may be set to the cell identity of the first public land mobile network (PLMN) identity included in the PLMN-identity-infoList broadcast in a system information block (SIB), e.g., SIB1 of the target cell, e.g., the cell that the UE is trying to resume. source-C-RNTI may be set to the cell radio network temporary identifier (C-RNTI) that the UE had in the PCell it was connected to prior to suspension of the RRC connection. However, the whole procedure of such proposals, e.g., using the "new" ResumeMAC-I may not be clarified at this time.

FIG. 8 is a flow chart diagram illustrating an example method of protecting messages related to resuming a connection, according to some embodiments. Aspects of the method of FIG. 8 may be implemented by a UE 106 in communication with a cellular network 100 (e.g., including one or more BS 102), as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, such as an AMF, N3IWF, etc.), may cause the UE, base station, and/or network element(s) to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish a connection with a network 100 (e.g. a PLMN, which may operate according to cellular standards such as NR) (802), according to some embodiments. The connection may include an RRC connection. The UE and network may exchange data and/or control information in the uplink and/or downlink directions.

The UE 106 and/or network 100 may release the connection (804), according to some embodiments. The UE or network may initiate the release. For example, the network may transmit an RRC release message to the UE causing the UE to release the connection. Such an RRC release message may include configuration information (e.g., SuspendConfig) related to the suspension of the connection. Among various possibilities, such configuration information may include information related to how the UE may resume the connection.

The UE 106 may determine whether and/or how the network (or one or more BS of the network) supports (e.g., and/or how the network has configured the UE to use) a resume request using a fully protected connection resume message (806), according to some embodiments. Such a determination may be made prior to establishing the connection (e.g., prior to starting the connection establishment process), concurrently with establishing the connection, after establishing the connection and prior to releasing the connection, concurrently with releasing the connection, or subsequently to releasing the connection, among various possibilities. In other words, 806 may occur before, after, or concurrently with either 802 or 804, or may occur between 802 and 804. Among various possibilities, the determination may be based on receiving an indication from the network or based on a response of the network to a message transmitted by the UE.

Three examples are provided below of the UE receiving an indication from the network of the network's support for (e.g., and/or configuration for the UE to use) a fully protected connection resume message. Such an indication may be transmitted by the network in the form of an information element (IE), e.g., a NewResumeMAC-I IE, a RRCResumeRequest IE, or a fully protected connection resume message IE, among various possibilities.

As a first example, the UE may receive one or more SIBs or other broadcasts transmitted by one or more BS of the network, and such a SIB or other broadcast may include an indication of the support of the network (or of the support of one or more BSs) for resume requests using a fully protected connection resume message. Among various possibilities, the UE may receive a SIB1 which may include an indication whether and/or how the network (or one or more BS of the network) supports resume requests using a fully protected connection resume message. Note that such an indication may be included in a different SIB (e.g., other than SIB1) or a master information block (MIB), among various possibilities. In some embodiments, the indication may be received prior to establishing an RRC connection. For example, the BS may periodically broadcast the indication, e.g., in a SIB. Such a SIB may be received prior to establishing an RRC connection, while an RRC connection is active, or after release of an RRC connection (e.g., by a UE entering an inactive or idle state). This example is further illustrated and described with respect to FIG. 10.

As a second example, the UE may receive such an indication from the network at a time associated with releasing the connection. For example, the network may include such an indication at the time of or in association with a message releasing or suspending a connection. For example, an IE for such an indication may be included in or with an RRCRelease message, a suspension configuration (e.g., SuspendConfig), etc. This example is further illustrated and described with respect to FIG. 11.

As a third example, the UE may receive an indication at multiple times. For example, the network may include such an indication in a SIB broadcast and in an RRC release. In other words, the network may include the indication as described in both the first and second examples above. This may allow the UE to mitigate the potential for a modification (e.g., a MiTM attack) of the SIB message. Thus, if the UE does not receive the indication in the RRC release (e.g., after receiving the indication in the SIB), the UE may determine that the network does not support the fully protected connection resume message (e.g., the UE may determine to use an old ResumeMAC-I). This example is further illustrated and described with respect to FIG. 12.

As mentioned above, the UE may determine support of the network (e.g., and/or the network's configuration for the UE to use) for a fully protected connection resume message based on a response of the network to one or more messages sent by the UE. In other words, the UE may indicate to the network that the UE supports a fully protected connection resume message, and may determine whether or not to use a fully protected connection resume message based on whether or how the network responds to the UE's indication. A network which does not support the fully protected connection resume message may have two options to respond to such an indication from a UE. As a first option, the network may configure the UE (e.g., upon releasing a connection, e.g., in a SuspendConfig or an RRCRelease) to use an old (e.g., not fully protected) connection resume message, e.g., an old ResumeMAC-I. In this case, the UE may receive an explicit instruction to use the old format for a connection resume message. As a second option, the network may not modify its response to the message including the UE's indication based on the UE's indication. In other words, the network may not respond to the UE's indication. However, it should be noted that the network may respond to other aspects of the message transmitted by the UE, e.g., if the message includes information in addition to the UE's indication of support for a fully protected connection resume message. Thus, the UE may not receive a response to its indication of support from the network. Based on such a lack of response and/or an explicit instruction to use the old format, the UE may determine that the network does not support a fully protected connection resume message. If the network does support a fully protected connection resume message, the network may either configure the UE (e.g., at the time of connection release) to use a fully protected connection resume message or otherwise reply with an indication that it supports this feature. Three examples of the UE providing such an indication to the network are provided below.

As a first example, the UE may include an indication upon establishing security, e.g., of the access stratum (AS). For example, the UE may include an indication of its support for a fully protected connection resume message when transmitting security mode command (SMC) complete message. This example is further illustrated and described with respect to FIG. 13.

As a second example, the UE may include an indication upon registering with the network. For example, the UE may include an indication of its support for a fully protected connection resume message when transmitting a registration request message. This example is further illustrated and described with respect to FIG. 14.

As a third example, the UE may include an indication upon establishing security e.g., of the non-access stratum (NAS). For example, the UE may include an indication of its support for a fully protected connection resume message when transmitting an SMC complete message, e.g., associated with the NAS. This example is further illustrated and described with respect to FIG. 15.

The UE 106 may resume the connection with the network 100 (808), according to some embodiments. The UE may transmit a fully protected connection resume message, (e.g., an RRCResumeRequest using a new ResumeMAC-I) and/or a not-fully protected connection resume message (e.g., an RRCResumeRequest using an old ResumeMAC-I). According to some embodiments, the UE may select whether to use a fully protected connection resume message and/or a not-fully protected connection resume message based on the determination of whether or how the network supports a fully protected connection resume message, e.g., as determined in 806. In other words, in response to a determination that the network supports (or does not support) a fully protected connection resume message, the UE may (or may not) use a fully protected connection resume message to resume the connection. In some embodiments, a UE may not use a fully protected connection resume message even if it determines that the network does support a fully protected connection resume message.

The UE and network may exchange further messages related to resuming the connection. For example, the network may transmit an RRC resume message and the UE may respond with an RRC resume complete message, according to some embodiments. The UE and network may exchange data and/or control information in the uplink and/or downlink directions.

FIGS. 9-15—Resuming a Connection

FIGS. 9-15 are a communication flow diagrams illustrating a UE 106 and a network 100 resuming a connection, according to some embodiments. It will be appreciated that the communication flows in these figures may be examples of the method of FIG. 8, but these examples are not limiting. In various embodiments, some of the elements shown may be performed concurrently, in a different order than shown, may be substituted for by other elements, or may be omitted. Additional elements may also be performed as desired.

Figure 9:
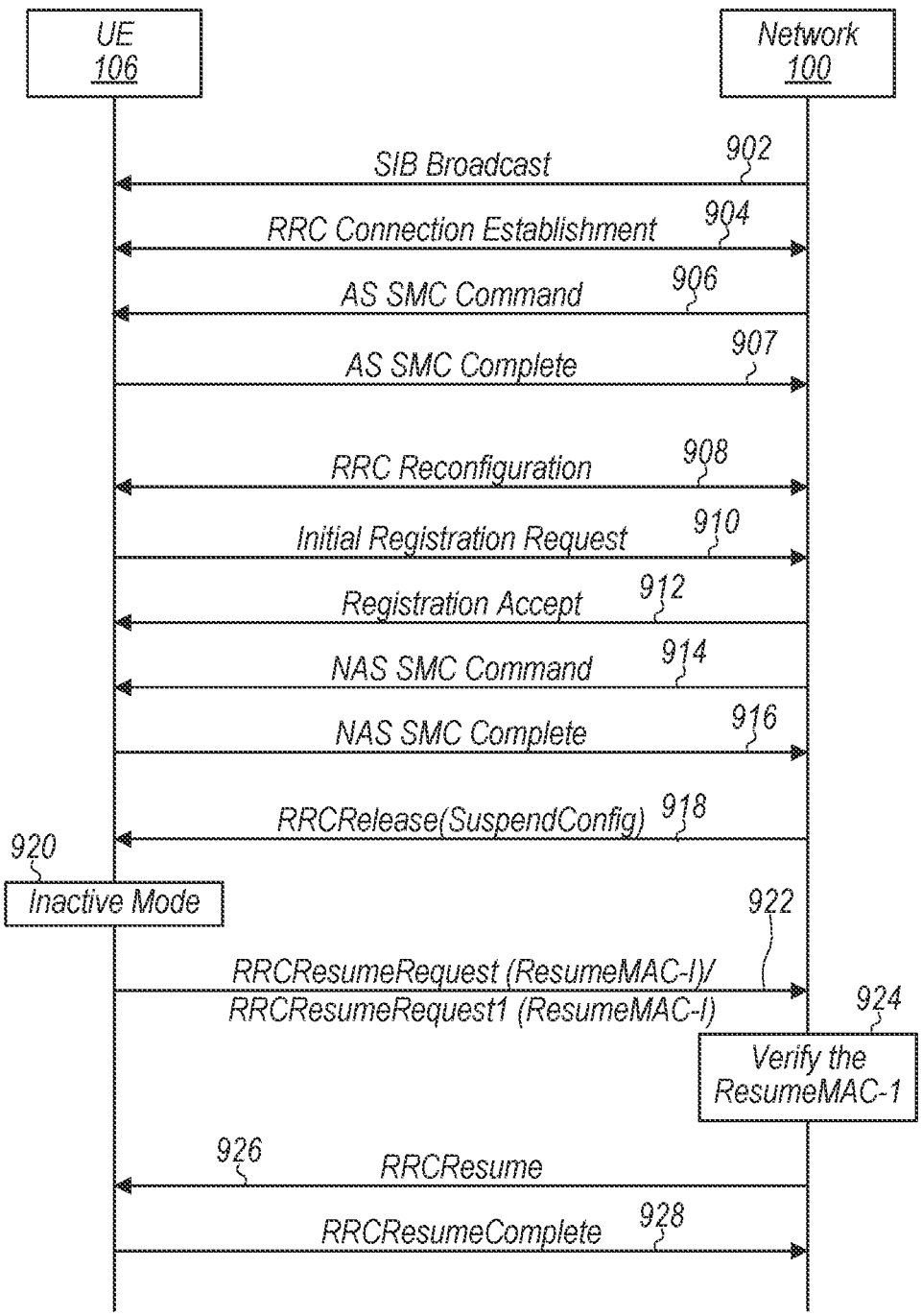
FIGS. 9-15 illustrate exemplary aspects of resuming connections, according to some embodiments.

As shown in FIG. 9, a UE 106 may receive a SIB or other message broadcast by a BS 102 of network 100 (902). The SIB or other broadcast message may include configuration information related to resuming a connection. For example, such a broadcast message may indicate what process may be used to determine whether a fully protected connection resume message is configured. In other words, the broadcast may identify what message(s) may be used by the UE and/or network to exchange indications about support for and/or configuration of connection resume messages. The UE may establish a connection, e.g., an RRC connection, with the network (904). The UE and network may establish security for AS, e.g., by the network transmitting an AS SMC command (906) and the UE responding with an AS SMC complete (907). The UE and network may perform configuration (and/or reconfiguration) of the connection (e.g., RRC reconfiguration) (908). The UE may register with the network, e.g., by transmitting an initial registration request (910) and the network may grant the registration, e.g., by transmitting a registration accept (912). The network may indicate to the UE to secure the NAS, e.g., by transmitting an NAS SMC command (914). The UE may establish NAS security and respond, e.g., with a NAS SMC complete (916). The network may determine to release the connection (e.g., by transmitting an RRCRelease, potentially including a SuspendConfig) (918).

Following release of the connection, the UE may operate in an inactive mode (920). Upon determining to resume the connection (e.g., in order to exchange data with the network), the UE may transmit a connection resume message (922), such as an RRCResumeRequest. As noted above, an RRCResumeRequest1 or other type of RRC resume request may be used, as appropriate. In the illustrated example, the connection resume message may not be fully protected (e.g., an old ResumeMAC-I may be used). However, it will be appreciated that a fully protected connection resume message and/or non-fully protected connection resume message may be used, according to some embodiments. For example, for a network which supports a fully protected connection resume message, the UE may include a new ResumeMAC-I, while for a legacy network which may not support a fully protected connection resume message, the UE may only include the old ResumeMAC-I.

The network may verify the connection resume message, e.g., using the ResumeMAC-I (924). If the connection resume message is not verified successfully, the network may reject the request and/or may not resume the connection. However, in response to successfully verifying the resume request, the network may accept the request (926), e.g., by transmitting an RRC resume message. The UE may respond with a message indicating that the connection is resumed (928) (e.g., RRC resume complete).

In some embodiments of the method of FIG. 8, the UE may not determine that the network supports a fully protected connection resume message. For example, the UE and network may not exchange signaling indicating that the network supports a fully protected connection resume message. In other words, 806 may not be performed, according to some embodiments. Thus, the UE may (e.g., at 922) use both an old ResumeMAC-I and a new ResumeMAC-I, e.g., in the same RRCResumeRequest message. The message may be described as follows: RRCResumeRequest(old ResumeMAC-I+newResumeMAC-I)/RRCResumeRequest1(old ResumeMAC-I+newResumeMAC-I). In this way, the UE may not rely on any indication from the network whether this network supports the verification of new ResumeMAC-I or not, e.g., whether the network supports a fully protected connection resume message. If the network does not support the fully protected connection resume message, the network may only verify the old ResumeMAC-I, and may ignore the new ResumeMAC-I. However, if the network supports a fully protected connection resume message, it may verify the new ResumeMAC-I.

Figure 10:
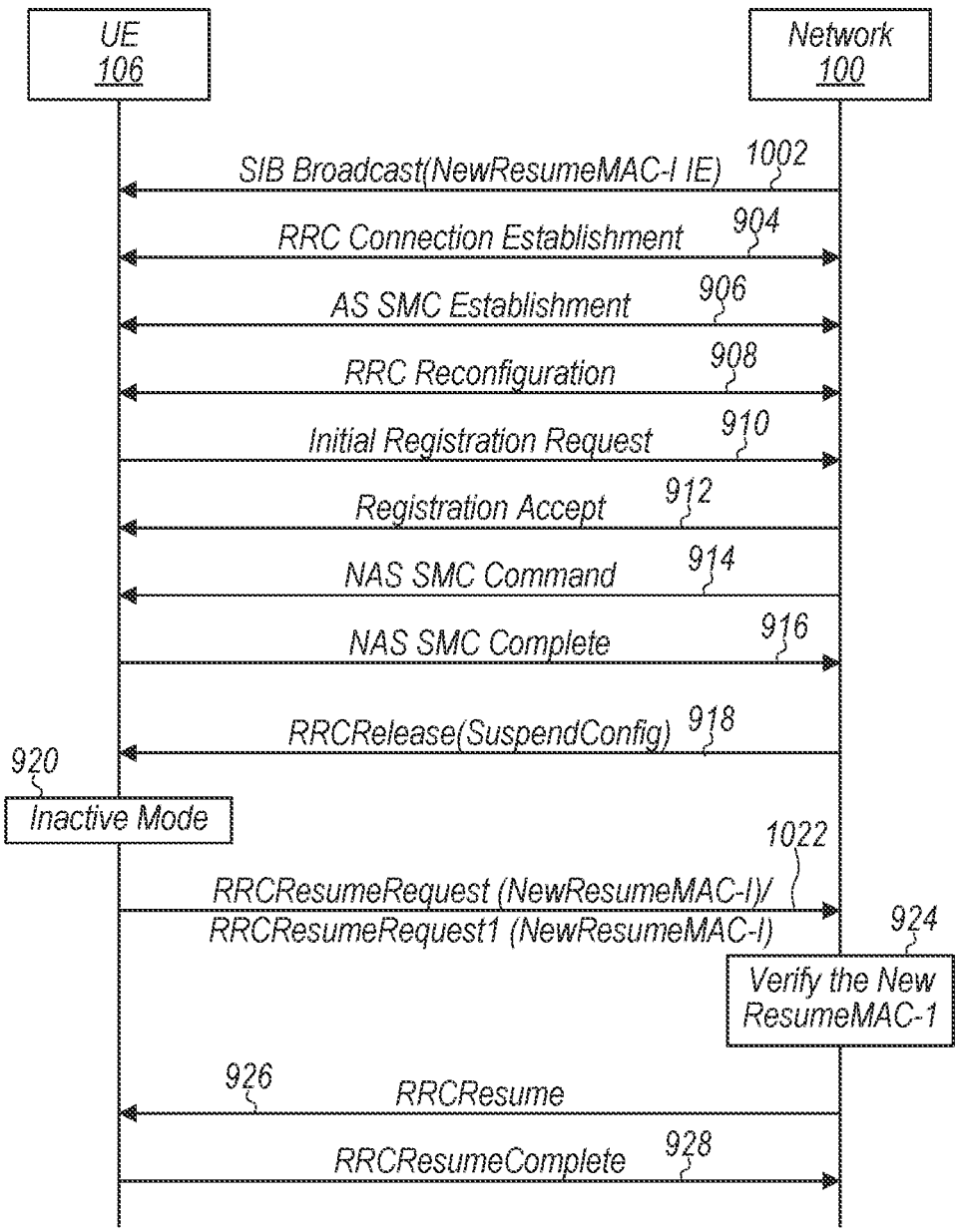

FIG. 10 illustrates an example in which the network provides an indication of its support for a fully protected connection resume message using a broadcast message, such as a SIB1. As shown, a UE 106 may receive a SIB broadcast by a BS 102 of network 100 (1002), according to some embodiments. The SIB may include an indication, e.g., as an IE or other message or field, that the network supports a fully protected connection resume message. For example, such an indication may be a fully protected connection resume message IE such as a NewResumeMAC-I IE, or a similar element. Based on the broadcast (e.g., and/or the indication within the broadcast message), the UE may determine that the network supports a fully protected connection resume message, e.g., as described above regarding 806. For example, the UE may determine to use a fully protected connection resume message in the event that the connection is suspended and to be resumed.

The UE and network may proceed to transmit/receive a broadcast, perform connection establishment, AS security, configuration, registration, NAS security, and connection release as described above with respect to 902-918 (note that these elements may be performed in a different order, one or more illustrated elements may be omitted, and/or additional elements may be performed). The UE may operate in inactive mode as discussed above regarding 920.

Upon determining to resume the connection, the UE may transmit a connection resume message (1022), according to some embodiments. In response to a determination (e.g., as discussed above with respect to 806) that the network supports (e.g., or has configured the UE to use) a fully protected connection resume message, the UE may use a fully protected connection resume message. As noted above the fully protected connection resume message may include the resume cause field as an input to the MAC-I token. If the UE did not determine that the network supports (or has configured the UE to use) a fully protected connection resume message, the UE may use a non-fully protected connection resume message.

The network may then verify the connection resume message (924) and the UE and network may resume the connection (926 and 928), as described above.

Figure 11:
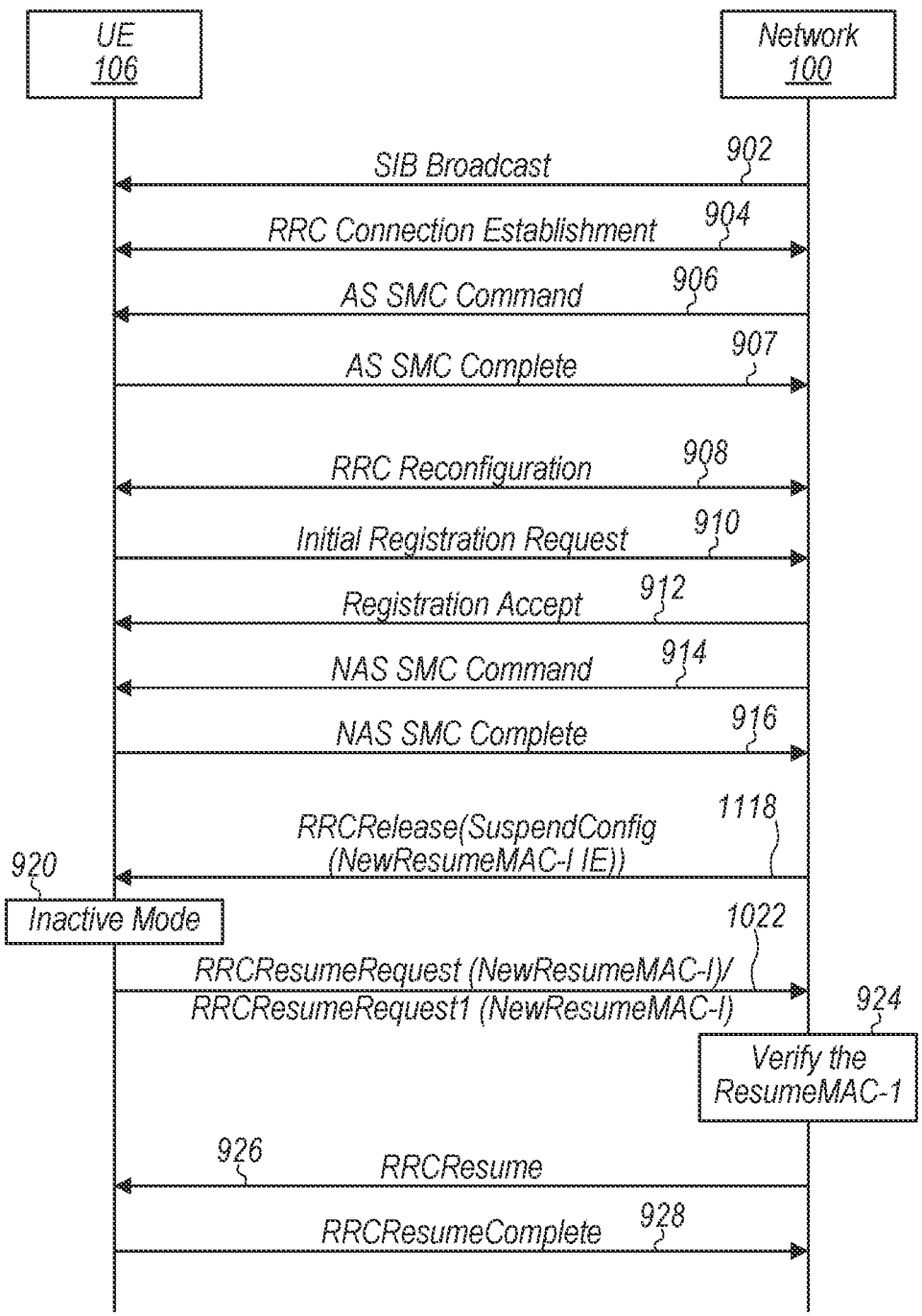

FIG. 11 illustrates an example in which the network provides an indication of its support for a fully protected connection resume message using a message associated with releasing the connection. As shown, the UE and network may establish a connection, AS and NAS security, perform registration, and perform configuration as described above with respect to 902-916 (note that these elements may be performed in a different order, one or more illustrated elements may be omitted, and/or additional elements may be performed).

The network may determine to release the connection (e.g., by transmitting an RRCRelease, potentially including a SuspendConfig and an indication that the network supports a fully protected connection resume message) (1118). For example, the parameters of the SuspendConfig may be used to configure the UE to use a fully protected connection resume message. It will be appreciated that the indication may be transmitted in any desired message and/or format associated with the connection release, e.g., in an RRCRelease or an associated message. For example, a fully protected connection resume message IE may be used. Additional configuration information related to the suspended connection may also be included.

Further, it will be appreciated that a network or base station that supports a fully protected connection resume message may configure (e.g., using parameters of the SuspendConfig) the UE to use a non-fully protected connection resume message, e.g., an old ResumeMAC-I. For example, a network may not configure use of a fully protected connection resume message (even though it supports such use) if some elements of the network (e.g., one or more BS) do not support the use of a fully protected connection resume message. Consistent connection resume messaging across BSs that do and do not support a fully protected connection resume message may be more convenient for network management. Similarly, a network that supports a fully protected connection resume message may not configure the use of a fully protected connection resume message if some of the UEs operating on the network do not support the fully protected connection resume message.

The UE may operate in inactive mode as discussed above regarding 920. The UE may initiate resuming the connection and may use a fully protected or non-fully protected connection resume message (e.g., according to a determination of whether the network supports or configures a fully protected connection resume message) as described above regarding 1022. The network may then verify the connection resume message (924) and the UE and network may resume the connection (926 and 928), as described above.

Figure 12:
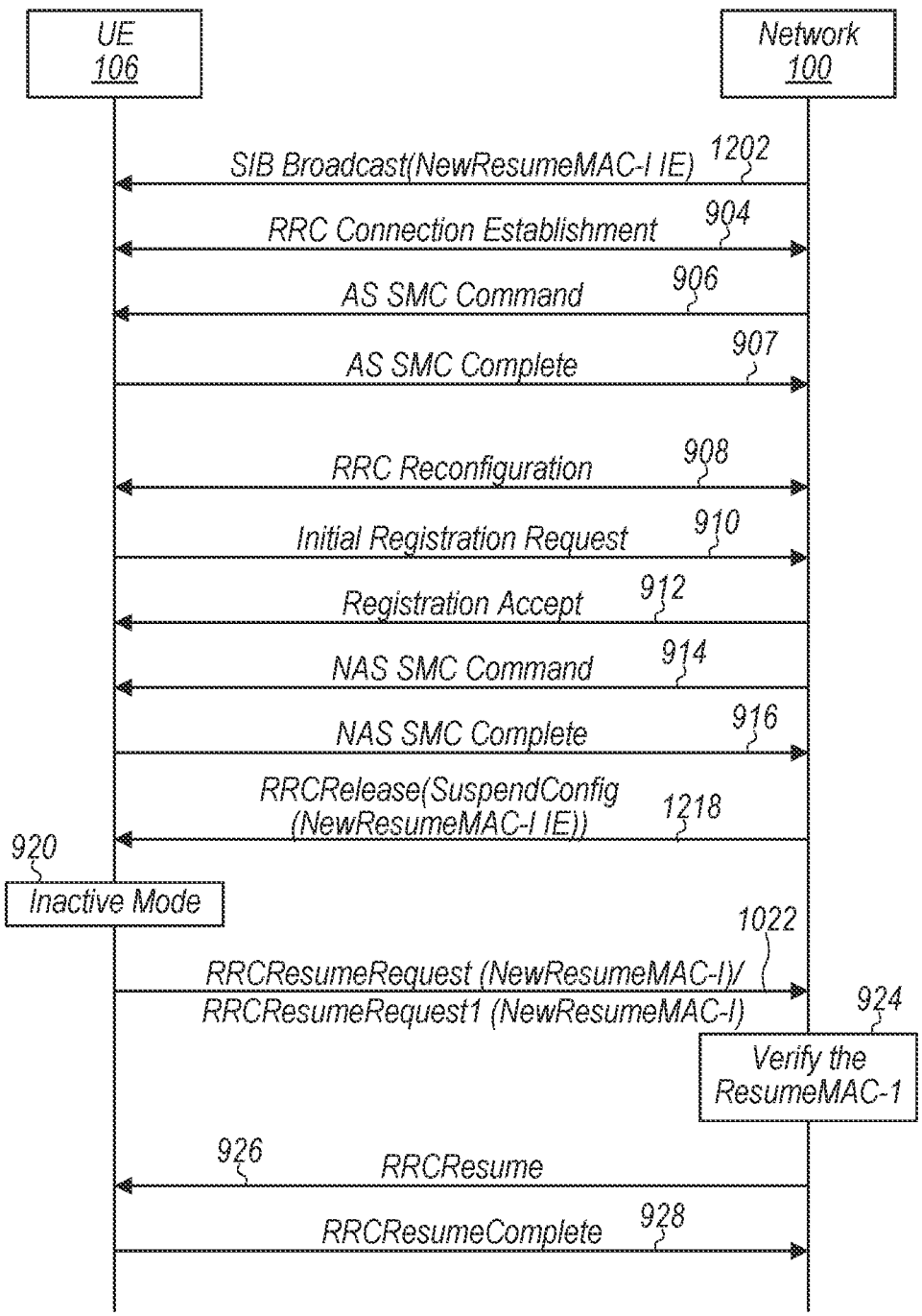

FIG. 12 illustrates an example in which the network provides an indication of its support for a fully protected connection resume message using both a broadcast message and a message associated with releasing the connection. As shown, a UE 106 may receive a SIB broadcast by a BS 102 of network 100 (1202), according to some embodiments. The SIB may include an indication, e.g., as an IE or other message or field, that the network supports a fully protected connection resume message. For example, such an indication may be a fully protected connection resume message IE such as a NewResumeMAC-I IE, or a similar element. Further, the message may include (e.g., in the IE or separately) an indication that the network may confirm that the UE is to use a fully protected connection resume message at the time of releasing the connection. In other words, the message may indicate that the UE should not use a fully protected connection resume message unless confirmed by the network during release, according to some embodiments. In other embodiments, the UE may be configured (e.g., based on standards) to anticipate such confirmation (e.g., and not to use a fully protected connection resume message unless such confirmation occurs), and no indication to that effect may be included in the broadcast message. Based on the broadcast (e.g., and/or the indication within the broadcast message), the UE may preliminarily determine that the network supports a fully protected connection resume message and that further confirmation is expected, e.g., as described above regarding 806. For example, the UE may determine to use a fully protected connection resume message in the event that the connection is suspended and to be resumed, subject to confirmation at the time of release.

The UE and network may proceed to transmit/receive a broadcast, perform connection establishment, AS security, configuration, registration, and NAS security as described above with respect to 902-916 (note that these elements may be performed in a different order, one or more illustrated elements may be omitted, and/or additional elements may be performed).

The network may determine to release the connection (e.g., by transmitting an RRCRelease, potentially including a SuspendConfig and an indication/confirmation that the network supports a fully protected connection resume message) (1218). In other words, the release message may confirm the preliminary indication (e.g., of 1202). For example, the parameters of the SuspendConfig may be used to configure the UE to use a fully protected connection resume message. It will be appreciated that the indication/confirmation may be transmitted in any desired message and/or format associated with the connection release, e.g., in an RRCRelease or an associated message. For example, a fully protected connection resume message IE may be used. Additional configuration information related to the suspended connection may also be included. Further, it will be appreciated that a network or base station that supports a fully protected connection resume message may configure (e.g., using parameters of the SuspendConfig) the UE to use a non-fully protected connection resume message, e.g., an old ResumeMAC-I. Similarly, such a network or base station may not confirm the preliminary indication (e.g., of 1202). Thus, the technique of FIG. 12 may allow the network to maintain flexibility to determine at the time of the connection release whether to configure the UE to use a fully protected connection resume message or not.

Following the connection release, the UE may operate in inactive mode as discussed above regarding 920. The UE may initiate resuming the connection and may use a fully protected or non-fully protected connection resume message (e.g., according to a determination of whether the network supports or configures a fully protected connection resume message) as described above regarding 1022.

The network may then verify the connection resume message (924) and the UE and network may resume the connection (926 and 928), as described above.

The example of FIG. 12 includes that the network may include an indication (e.g., NewResumeMAC-I IE) in both the SIB and the SuspendConfig IE in RRCRelease message if it supports and/or configures a fully protected connection resume message. For example, if the UE reads this IE in SIB1 and SuspendConfig IE, when the UE sends RRCResumeRequest message, it may use the new ResumeMAC-I. If the UE does not read this IE in both SIB1 and SuspendConfig IE, the UE may use old ResumeMAC-I.

Figure 13:
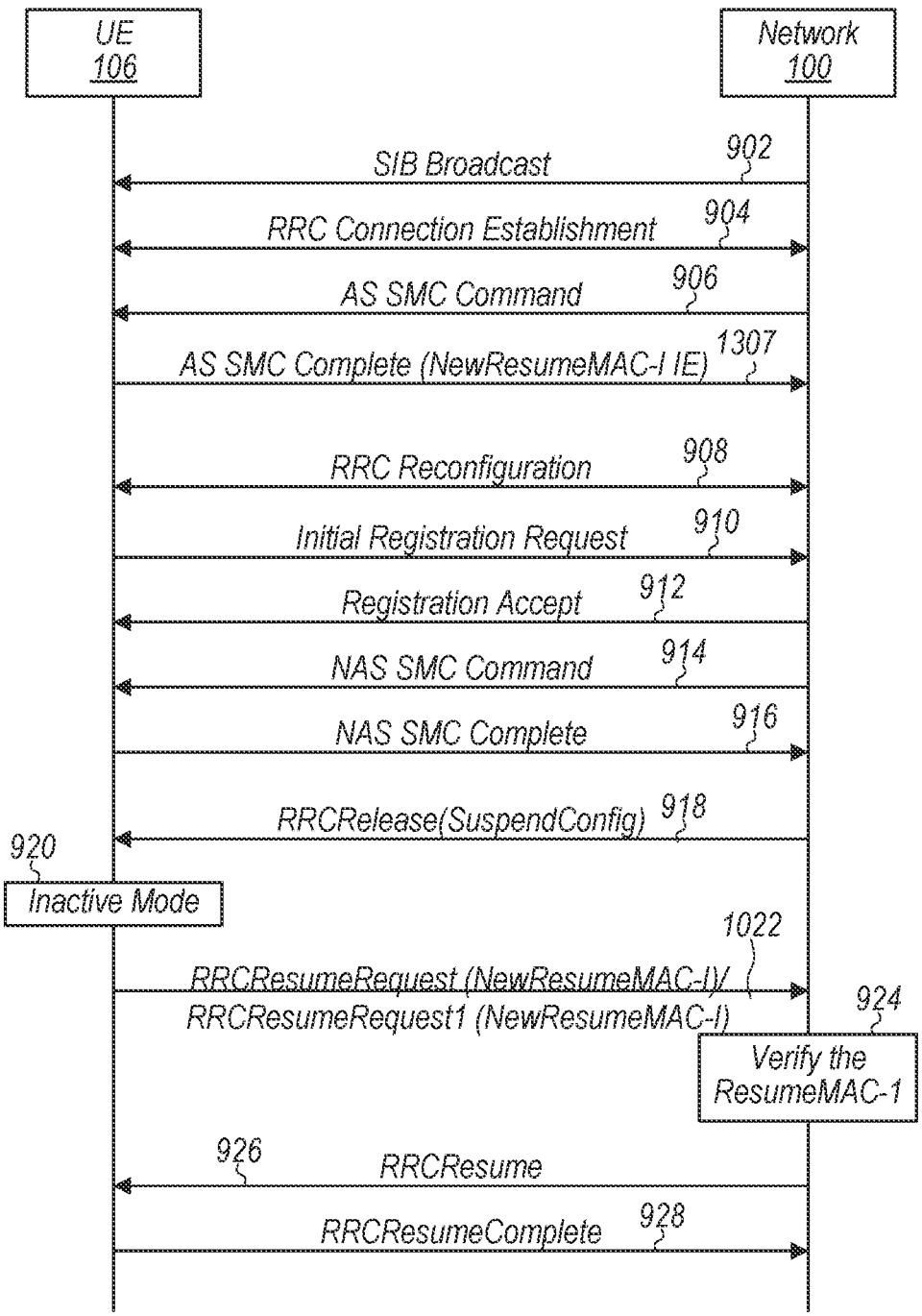

FIG. 13 illustrates an example in which the UE may provide an indication to the network of its support for a fully protected connection resume message using an AS SMC complete message and the network may provide an indication of its support (or configuration of) a fully protected connection resume message in response. As shown, the UE and network may transmit/receive a broadcast and establish a connection, as described with respect to 902 and 904. The network may transmit an AS SMC command as in 906. The UE may respond with an AS SMC complete message (1307), according to some embodiments. The UE may include an indication, in the AS SMC complete message, of its support for a fully protected connection resume message. The indication may be a field in the AS SMC complete message. For example, the indication may be a fully protected connection resume message IE. Accordingly, the UE may determine whether the network supports (and/or configures the UE to use) a fully protected connection resume message based on whether or how the network acknowledges or responds to the indication. Such a response or acknowledgement may be included in any later message (e.g., RRC reconfiguration as in 908, registration accept as in 912, NAS security as in 914, and/or connection release as in 918). Further, such a response or acknowledgement may be included in a different message. Such a response or acknowledgement may be or include a fully protected connection resume message IE and/or configuration information (e.g., in SuspendConfig), among various possibilities.

The UE and network may proceed to perform configuration, registration, NAS security, and connection release as described above with respect to 908-918 (note that these elements may be performed in a different order, one or more illustrated elements may be omitted, and/or additional elements may be performed). Note that any of 908, 912, 914, and/or 918 may be modified to incorporate a response/acknowledgement from the network as discussed above. The UE may operate in inactive mode as discussed above regarding 920. The UE may initiate resuming the connection and may use a fully protected or non-fully protected connection resume message (e.g., according to a determination of whether the network supports or configures a fully protected connection resume message) as described above regarding 1022. The network may then verify the connection resume message (924) and the UE and network may resume the connection (926 and 928), as described above.

Figure 14:
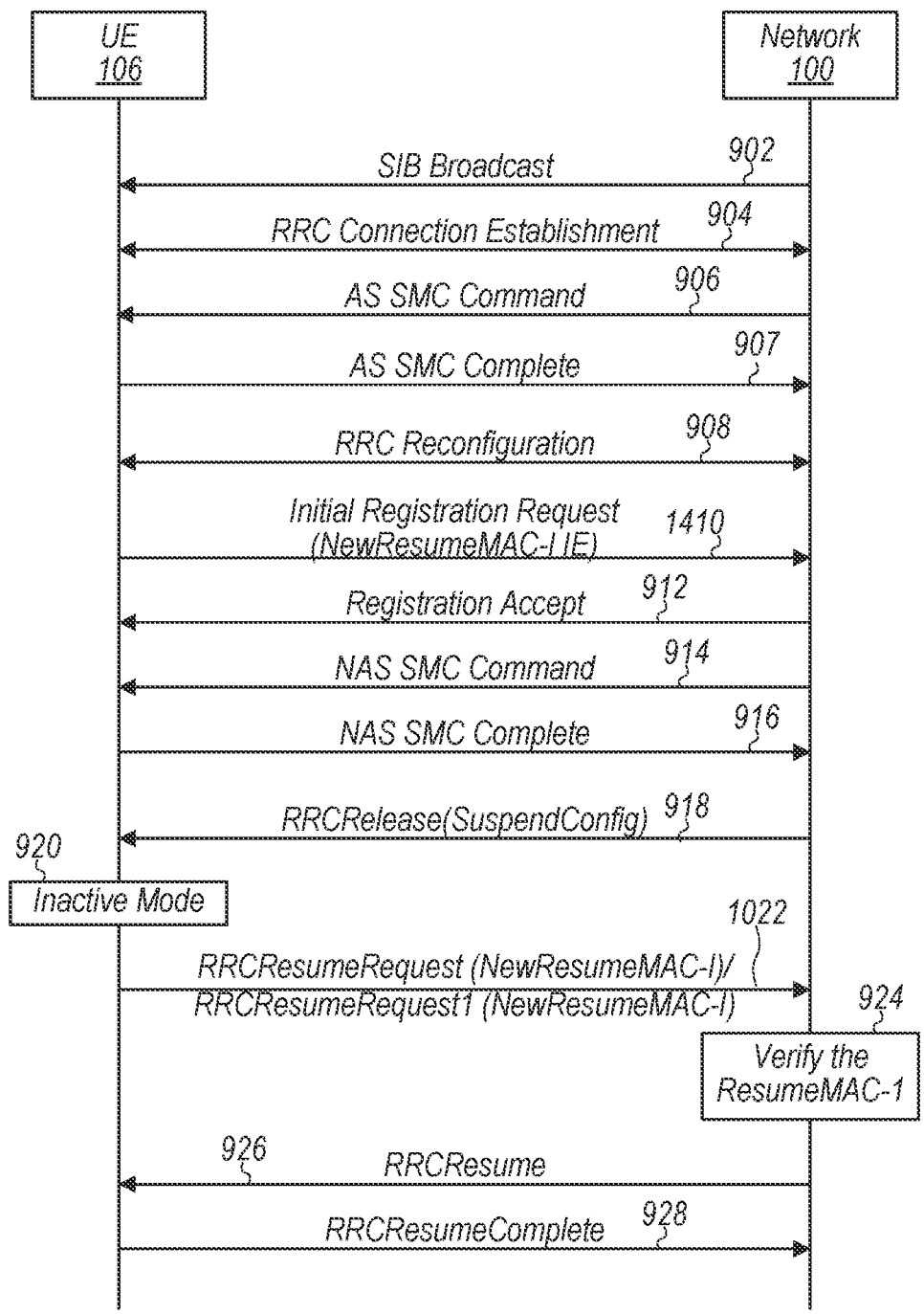

FIG. 14 illustrates an example in which the UE may provide an indication to the network of its support for a fully protected connection resume message using a registration request message and the network may provide an indication of its support (or configuration of) a fully protected connection resume message in response. As shown, the UE and network may transmit/receive a broadcast, establish a connection, secure the AS, and perform configuration as described with respect to 902-908 (note that these elements may be performed in a different order, one or more illustrated elements may be omitted, and/or additional elements may be performed). The UE may initiate registration, eg., by transmitting a registration request (1410), according to some embodiments. The UE may include an indication, in the registration request message, of its support for a fully protected connection resume message. The indication may be a field in the registration request complete message. For example, the indication may be a fully protected connection resume message IE. Accordingly, the UE may determine whether the network supports (and/or configures the UE to use) a fully protected connection resume message based on whether or how the network acknowledges or responds to the indication. Such a response or acknowledgement may be included in any later message (e.g., registration accept as in 912, NAS security as in 914, and/or connection release as in 918). Further, such a response or acknowledgement may be included in a different message. Such a response or acknowledgement may be or include a fully protected connection resume message IE and/or configuration information (e.g., in SuspendConfig), among various possibilities.

The UE and network may proceed to complete the registration, perform NAS security, and connection release as described above with respect to 912-918 (note that these elements may be performed in a different order, one or more illustrated elements may be omitted, and/or additional elements may be performed). Note that any of 912, 914, and/or 918 may be modified to incorporate a response/acknowledgement from the network as discussed above. The UE may operate in inactive mode as discussed above regarding 920. The UE may initiate resuming the connection and may use a fully protected or non-fully protected connection resume message (e.g., according to a determination of whether the network supports or configures a fully protected connection resume message) as described above regarding 1022. The network may then verify the connection resume message (924) and the UE and network may resume the connection (926 and 928), as described above.

Figure 15:
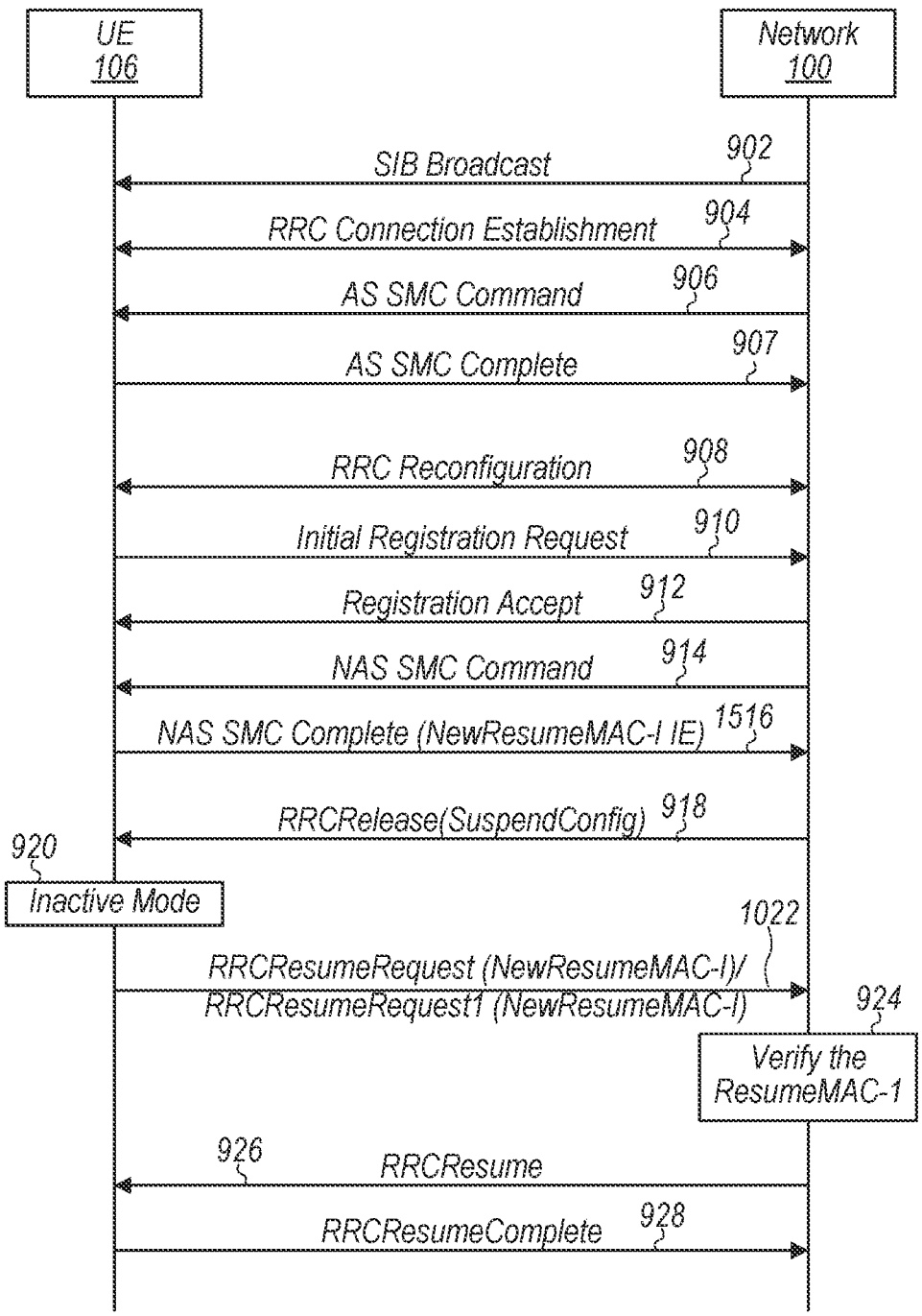

FIG. 15 illustrates an example in which the UE may provide an indication to the network of its support for a fully protected connection resume message using a NAS SMC complete message and the network may provide an indication of its support (or configuration of) a fully protected connection resume message in response. As shown, the UE and network may transmit/receive a broadcast, establish a connection, secure the AS, perform configuration, perform registration, and transmit/receive a NAS SMC command as described with respect to 902-914 (note that these elements may be performed in a different order, one or more illustrated elements may be omitted, and/or additional elements may be performed). The UE may include an indication, in a NAS SMC complete message (1516), of its support for a fully protected connection resume message. The indication may be a field in the NAS SMC complete message. For example, the indication may be a fully protected connection resume message IE. Accordingly, the UE may determine whether the network supports (and/or configures the UE to use) a fully protected connection resume message based on whether or how the network acknowledges or responds to the indication. Such a response or acknowledgement may be included in any later message (e.g., connection release as in 918 or a different message). Such a response or acknowledgement may be or include a fully protected connection resume message IE and/or configuration information (e.g., in SuspendConfig), among various possibilities.

The UE and network may proceed to perform connection release as described above with respect to 918. Note that 918 may be modified to incorporate a response/acknowledgement from the network as discussed above. The UE may operate in inactive mode as discussed above regarding 920. The UE may initiate resuming the connection and may use a fully protected or non-fully protected connection resume message (e.g., according to a determination of whether the network supports or configures a fully protected connection resume message) as described above regarding 1022. The network may then verify the connection resume message (924) and the UE and network may resume the connection (926 and 928), as described above.

Additional Information and Examples

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a network may configure different UEs (or the same UE at different times) to use different types of connection resume messages. For example, under some conditions (e.g., some types of UEs, some network load conditions, etc.), the network may configure a UE to use a non-fully protected connection resume message, while under other conditions the network may configure a UE to use a fully protected connection resume message.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a processor configured to cause a user equipment device (UE) to:
establish a connection with a network;
receive, from the network, a broadcast message including a first indication that the network supports a fully protected connection resume message, wherein all fields except a ResumeMAC-I part are protected in the fully protected connection resume message;
receive, from the network, a second indication in a radio resource control (RRC) Release message with SuspendConfig that the network supports the fully protected connection resume message;
release the connection with the network;
in response to both the first and second indication, determine that the network supports and/or configures the fully protected connection resume message; and
in response to the determination that the network does support the fully protected connection resume message:
transmit, to the network, the fully protected connection resume message; and
resume the connection with the network.

2. The apparatus of claim 1, wherein the fully protected connection resume message includes a resume cause field, wherein the determination is based on an information element.

3. The apparatus of claim 1, wherein the ResumeMAC-I part comprises a token.

4. The apparatus of claim 1, wherein the second indication is provided as a configuration in the RRC release message.

5. The apparatus of claim 1, wherein the processor is further configured to cause the UE to transmit, to the network, an indication that the UE supports the fully protected connection resume message.

6. The apparatus of claim 5, wherein the determination is based on a response of the network to the indication that the UE supports the fully protected connection resume message.

7. The apparatus of claim 5, wherein the an indication that the UE supports the fully protected connection resume message is transmitted when transmitting security mode command (SMC) complete message.

8. The apparatus of claim 5, wherein the second indication of support for the fully protected connection resume message is responsive to the indication that the UE supports the fully protected connection resume message.

9. A method for operating a base station (BS) of a network, the method comprising:
at the BS:
establishing a connection with a user equipment device (UE);
transmitting, to the UE, a broadcast message including an first indication that the network supports a fully protected connection resume message, wherein all fields except a ResumeMAC-I part are protected in the fully protected connection resume message;
transmitting, to the UE, a second indication in a radio resource control (RRC) Release message with SuspendConfig that the network supports the fully protected connection resume message;
releasing the connection with the UE;
receiving, from the UE, the fully protected connection resume message;
verifying the fully protected connection resume message; and
resuming the connection with the UE.

10. The method of claim 9, wherein the second indication is transmitted in an information element.

11. The method of claim 9, wherein the second indication is transmitted in response to an indication that the UE supports the fully protected connection resume message.

12. The method of claim 9, wherein the second indication is transmitted in a broadcast message.

13. The method of claim 12, the method further comprising providing a third indication configuring the UE to use the fully protected connection resume message, wherein the third indication configuring the UE to use the fully protected connection resume message is provided in a connection release message.

14. The method of claim 9, wherein the ResumeMAC-I part comprises a token.

15. The method of claim 9, wherein the second indication is provided as a configuration in the RRC release message.

16. The method of claim 9, the method further comprising configuring a second UE different from the UE to use a non-fully protected connection resume message.

17. A user equipment device (UE), comprising:
a radio; and
a processor operably connected to the radio and configured to cause the UE to:
establish a connection with a network;
receive, from the network, a broadcast message including a first indication that the network supports a fully protected connection resume message, wherein all fields except a ResumeMAC-I part are protected in the fully protected connection resume message;
receive, from the network, a second indication in a radio resource control (RRC) Release message with SuspendConfig that the network supports the fully protected connection resume message;
release the connection with the network;

in response to both the first and second indication, determine that the network supports the fully protected connection resume message; and in response to the determination that the network does support the fully protected connection resume message:

transmit, to the network, the fully protected connection resume message; and resume the connection with the network.

18. The UE of claim 17, wherein the fully protected connection resume message includes a resume cause field, wherein the determination is based on an information element.

19. The UE of claim 17, wherein the ResumeMAC-I part comprises a token.

20. The UE of claim 17, wherein the second indication is provided as a configuration in the RRC release message.

\* \* \* \* \*

UNITED STATES PATENT AND TRADEMARK OFFICE
CERTIFICATE OF CORRECTION

PATENT NO. : 12,245,308 B2
APPLICATION NO. : 17/776449
DATED : March 4, 2025
INVENTOR(S) : Shu Guo et al.

Page 1 of 1

It is certified that error appears in the above-identified patent and that said Letters Patent is hereby corrected as shown below:

In the Claims

Column 25, Line 47, delete "and/or configures".

Signed and Sealed this
Thirteenth Day of May, 2025

Coke Morgan Stewart
*Acting Director of the United States Patent and Trademark Office*